US012603826B2

(12) United States Patent
Balasubramanian et al.

(10) Patent No.: US 12,603,826 B2
(45) Date of Patent: Apr. 14, 2026

(54) TESTING TRANSCEIVER PORTS OF A NETWORK DEVICE WITH ON-CHIP TIME DOMAIN REFLECTOMETRY DIAGNOSTIC TESTS

(71) Applicant: Juniper Networks, Inc., Sunnyvale, CA (US)

(72) Inventors: Abhiram Balasubramanian, Foster City, CA (US); Joyce Kitabayashi, Cupertino, CA (US); Junchun Liang, Santa Clara, CA (US); Peter C. Nguyen, San Jose, CA (US); Robin Philip, Cupertino, CA (US); Shaghayegh Azgomi, Los Altos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 228 days.

(21) Appl. No.: 18/344,728

(22) Filed: Jun. 29, 2023

(65) Prior Publication Data

US 2025/0007814 A1     Jan. 2, 2025

(51) Int. Cl.
*H04L 43/50* (2022.01)

(52) U.S. Cl.
CPC .................................... *H04L 43/50* (2013.01)

(58) Field of Classification Search
CPC ......... G01R 31/11; G01R 31/58; H04L 43/50; H04L 45/00
See application file for complete search history.

(56) References Cited

U.S. PATENT DOCUMENTS

| | | | |
|---|---|---|---|
| 7,136,772 B2 | 11/2006 | Duchi et al. | |
| 7,294,904 B1 | 11/2007 | Chee et al. | |
| 7,454,658 B1 | 11/2008 | Baxter | |
| 7,650,248 B1 | 1/2010 | Baxter | |
| 2004/0232919 A1* | 11/2004 | Lacey | G01R 31/11 |
| | | | 324/533 |
| 2007/0022331 A1* | 1/2007 | Jamieson | G06F 11/0709 |
| | | | 714/E11.207 |

(Continued)

FOREIGN PATENT DOCUMENTS

| | | |
|---|---|---|
| CN | 211239868 U | 8/2020 |

OTHER PUBLICATIONS

European Patent Application No. 231952268, Extended European Search Report dated Feb. 12, 2024.

*Primary Examiner* — Noam Reisner
(74) *Attorney, Agent, or Firm* — Juniper Networks, Inc.

(57) ABSTRACT

A network device may identify an integrated circuit, a port group number, port lanes, and port channels associated with a transceiver port of a network device, and may map the integrated circuit, the port group number, the port lanes, and the port channels to the transceiver port. The network device may provide a time domain reflectometry pulse to a channel of the transceiver port at a first time and with a first voltage, and may receive a reflected time domain reflectometry pulse via the channel at a second time and with a second voltage. The network device may calculate a distance and an impedance of the channel based on the first time, the second time, the first voltage, and the second voltage, and may determine a status of the channel based on the distance and the impedance. The network device may output the status of the first channel.

20 Claims, 12 Drawing Sheets

(56) References Cited

U.S. PATENT DOCUMENTS

| | | | |
|---|---|---|---|
| 2019/0195936 A1* | 6/2019 | Park | G01R 31/2853 |
| 2019/0291461 A1* | 9/2019 | Neeb | B41J 2/2142 |
| 2020/0256911 A1* | 8/2020 | Lang | G01R 27/28 |
| 2021/0384941 A1* | 12/2021 | German | H04B 3/46 |

* cited by examiner

100

Server device

Network

Network device

Network device

105
Receive network traffic

User device

100

115
Identify and map an ASIC, a port group number, port lanes, and port channels to the WAN transceiver port of the network device

100

120
Provide a TDR pulse to a first channel of the WAN transceiver port at a first time and with a first voltage 125
Receive a reflected TDR pulse via the first channel at a second time and with a second voltage

100

| Port # | Port Group # | Lane # | P (1) / N (0) | Result | Failure Location |
|--------|--------------|--------|---------------|--------|------------------|
| 3 | 15 | 0 | 0 | Open | 23.0 |
| 3 | 15 | 0 | 1 | Impedance matched | N/A |
| 3 | 15 | 1 | 0 | Open | 4.0 |
| 3 | 15 | 1 | 1 | Impedance matched | N/A |
| 3 | 15 | 2 | 0 | Impedance matched | N/A |
| 3 | 15 | 2 | 1 | Impedance matched | N/A |
| 3 | 15 | 3 | 0 | Impedance matched | N/A |
| 3 | 15 | 3 | 1 | Impedance matched | N/A |
| 3 | 15 | 4 | 0 | Impedance matched | N/A |
| 3 | 15 | 4 | 1 | Impedance matched | N/A |
| 3 | 15 | 5 | 0 | Impedance matched | N/A |
| 3 | 15 | 5 | 1 | Impedance matched | N/A |
| 3 | 15 | 6 | 0 | Impedance matched | N/A |
| 3 | 15 | 6 | 1 | Impedance matched | N/A |
| 3 | 15 | 7 | 0 | Impedance matched | N/A |
| 3 | 15 | 7 | 1 | Impedance matched | N/A |
| 32 | 5 | 0 | 0 | Impedance matched | N/A |
| 32 | 5 | 0 | 1 | Impedance matched | N/A |
| *** | *** | *** | *** | *** | *** |

FIG. 1H

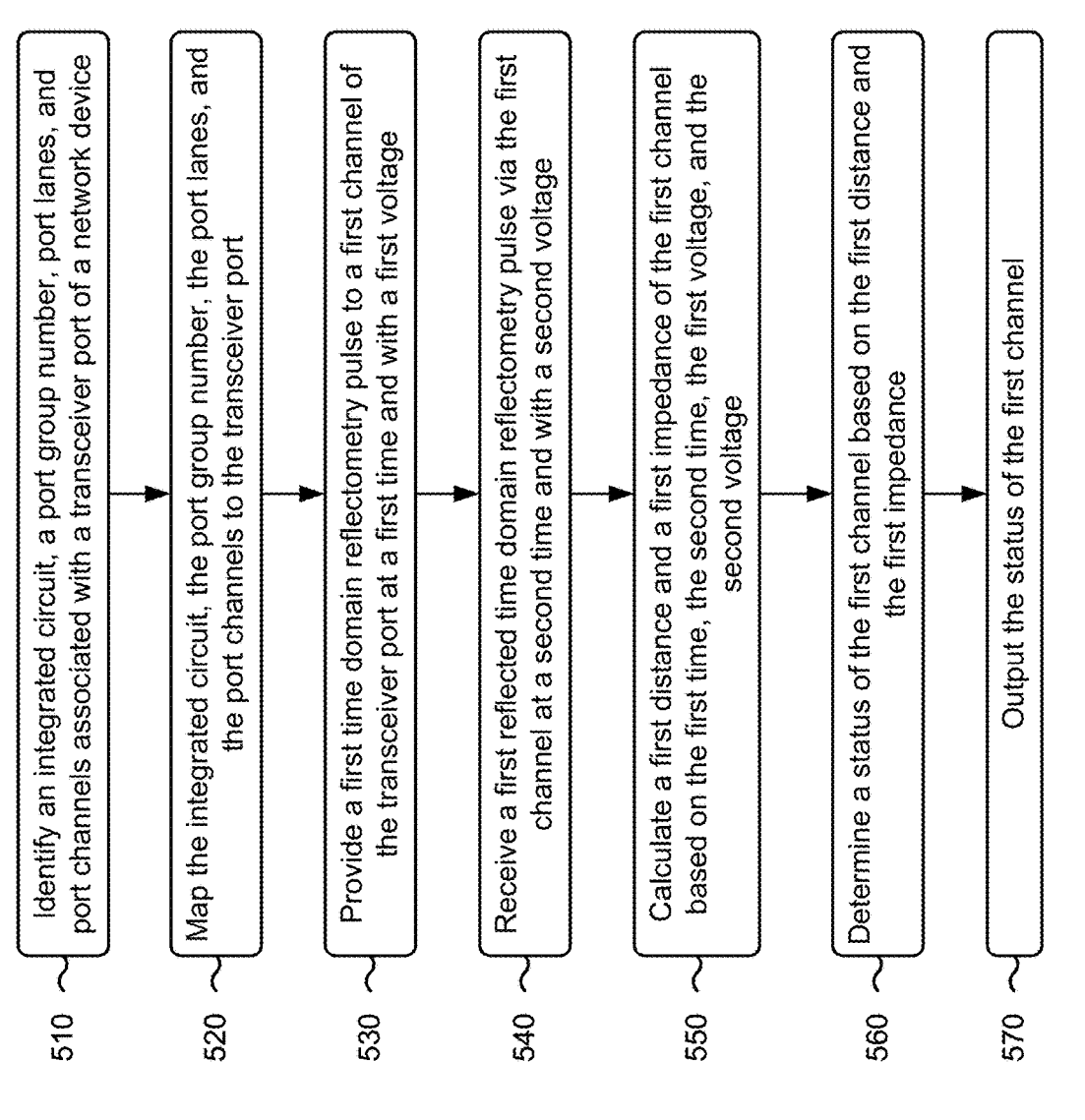

500

510    Identify an integrated circuit, a port group number, port lanes, and port channels associated with a transceiver port of a network device 520    Map the integrated circuit, the port group number, the port lanes, and the port channels to the transceiver port 530    Provide a first time domain reflectometry pulse to a first channel of the transceiver port at a first time and with a first voltage 540    Receive a first reflected time domain reflectometry pulse via the first channel at a second time and with a second voltage 550    Calculate a first distance and a first impedance of the first channel based on the first time, the second time, the first voltage, and the second voltage 560    Determine a status of the first channel based on the first distance and the first impedance 570    Output the status of the first channel

FIG. 5

TESTING TRANSCEIVER PORTS OF A NETWORK DEVICE WITH ON-CHIP TIME DOMAIN REFLECTOMETRY DIAGNOSTIC TESTS

BACKGROUND

Signal qualities at high-speed (e.g., one hundred gigabits) serializer/deserializer (serdes) wide area network (WAN) transceiver ports of a network device need to be tested for any impairment before deployment of the network device and/or during deployment of the network device. Traditional techniques do not scale for testing large quantities of transceiver ports and are time consuming and expensive.

SUMMARY

Some implementations described herein relate to a method. The method may include identifying an integrated circuit, a port group number, port lanes, and port channels associated with a transceiver port of a network device, and mapping the integrated circuit, the port group number, the port lanes, and the port channels to the transceiver port. The method may include providing a first time domain reflectometry pulse to a first channel of the transceiver port at a first time and with a first voltage, and receiving a first reflected time domain reflectometry pulse via the first channel at a second time and with a second voltage. The method may include calculating a first distance and a first impedance of the first channel based on the first time, the second time, the first voltage, and the second voltage, and determining a status of the first channel based on the first distance and the first impedance. The method may include outputting the status of the first channel. The status may indicate whether the first channel passes or fails based on whether the first channel satisfies a programmable threshold.

Some implementations described herein relate to a network device that may include one or more processors. The one or more processors may be configured to identify an integrated circuit, a port group number, port lanes, and port channels associated with a transceiver port of a network device, and map the integrated circuit, the port group number, the port lanes, and the port channels to the transceiver port. The one or more processors may be configured to provide a first time domain reflectometry pulse to a first channel of the transceiver port at a first time and with a first voltage, and receive a first reflected time domain reflectometry pulse via the first channel at a second time and with a second voltage. The one or more processors may be configured to calculate a first distance and a first impedance of the first channel based on the first time, the second time, the first voltage, and the second voltage, and determine a status of the first channel based on the first distance and the first impedance. The one or more processors may be configured to provide a second time domain reflectometry pulse to a second channel of the transceiver port at a third time and with a third voltage, and receive a second reflected time domain reflectometry pulse via the second channel at a fourth time and with a fourth voltage. The one or more processors may be configured to calculate a second distance and a second impedance of the second channel based on the third time, the fourth time, the third voltage, and the fourth voltage, and determine a status of the second channel based on the second distance and the second impedance. The one or more processors may be configured to output the status of the first channel and the status of the second channel.

Some implementations described herein relate to a non-transitory computer-readable medium that stores a set of instructions for a network device. The set of instructions, when executed by one or more processors of the network device, may cause the network device to identify a transceiver port of a network device, and provide a first time domain reflectometry pulse to a first channel of the transceiver port at a first time and with a first voltage. The set of instructions, when executed by one or more processors of the network device, may cause the network device to receive a first reflected time domain reflectometry pulse via the first channel at a second time and with a second voltage, and calculate a first distance and a first impedance of the first channel based on the first time, the second time, the first voltage, and the second voltage. The set of instructions, when executed by one or more processors of the network device, may cause the network device to determine a status of the first channel based on the first distance and the first impedance, and provide a second time domain reflectometry pulse to a second channel of the transceiver port at a third time and with a third voltage. The set of instructions, when executed by one or more processors of the network device, may cause the network device to receive a second reflected time domain reflectometry pulse via the second channel at a fourth time and with a fourth voltage, and calculate a second distance and a second impedance of the second channel based on the third time, the fourth time, the third voltage, and the fourth voltage. The set of instructions, when executed by one or more processors of the network device, may cause the network device to determine a status of the second channel based on the second distance and the second impedance, and output the status of the first channel and the status of the second channel.

BRIEF DESCRIPTION OF THE DRAWINGS

FIGS. 1A-1H are diagrams of an example associated with testing transceiver ports of a network device with on-chip time domain reflectometry diagnostic tests.

FIG. 5 is a flowchart of an example process for testing transceiver ports of a network device with on-chip time domain reflectometry diagnostic tests.

DETAILED DESCRIPTION

Figure 1A:
Figure 1A:
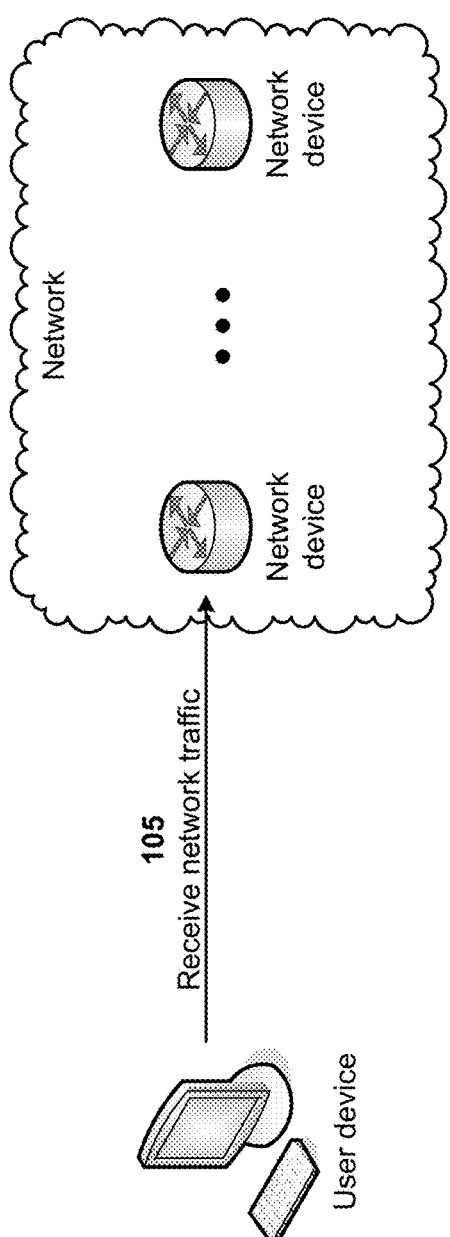

The following detailed description of example implementations refers to the accompanying drawings. The same reference numbers in different drawings may identify the same or similar elements.

The WAN transceiver ports (e.g., one hundred gigabit (G) WAN) of a network device need to be tested for improperly connected cable connectors, opens, or shorts (e.g., that could cause functional failure in the network device), and/or the like. Current diagnostic test devices require disassembling the network device, utilizing instrument-grade time domain reflectometry (TDR) with a host compliance board (HCB), to measure the transmit and receive channels of the WAN transceiver ports or fabric transceiver ports, and analyzing test results to identify, for example, any opens or shorts. Such a testing arrangement does not scale for testing large quantities of network devices, is expensive and time consuming, and requires technical expertise to analyze test results and identify problems with the network devices. Thus, current techniques for testing 100G WAN transceiver ports of a network device consume computing resources (e.g., processing resources, memory resources, communication resources, and/or the like), networking resources, and/or the like, associated with disassembling the network device, utilizing an instrument-grade TDR and using a HCB to measure WAN transceiver ports of the network device, analyzing test results and identifying problems in the network device, and/or the like.

Some implementations described herein relate to a network device (e.g., an on-chip diagnostic tool of a network device) that tests transceiver ports of the network device with on-chip time domain reflectometry diagnostic tests. For example, the network device may identify an integrated circuit, a port group number, port lanes, and port channels associated with a transceiver port of a network device, and may map the integrated circuit, the port group number, the port lanes, and the port channels to the transceiver port. The network device may provide a first TDR pulse to a first channel of the transceiver port at a first time and with a first voltage, and may receive a first reflected TDR pulse via the first channel at a second time and with a second voltage. The network device may calculate a first distance and a first impedance of the first channel based on the first time, the second time, the first voltage, and the second voltage, and may determine a status of the first channel based on the first distance and the first impedance. The network device may provide a second TDR pulse to a second channel of the transceiver port at a third time and with a third voltage, and may receive a second reflected TDR pulse via the second channel at a fourth time and with a fourth voltage. The network device may calculate a second distance and a second impedance of the second channel based on the third time, the fourth time, the third voltage, and the fourth voltage, and may determine a status of the second channel based on the second distance and the second impedance. The network device may output the status of the first channel and the status of the second channel. The method employed by the network device (e.g., by the diagnostic tool) may be utilized by manufacturing, field testing, and/or the like personnel for eight hundred gigabit (G) WAN ports applications, for validation of channels associated with a fabric interface (a chip-to-chip interface) of the network device, and/or the like.

In this way, the network device tests transceiver ports of a network device with on-chip time domain reflectometry diagnostic tests. For example, the network device may include an on-chip TDR diagnostic tool that detects opens, shorts, matched channels, and unmatched channels on WAN transceiver (e.g., serdes) ports of a network device without disrupting the network device. The on-chip TDR diagnostic tool may be used by manufacturing personnel, engineering personnel, or field-testing teams to identify problems with WAN transceiver ports (e.g., 800 G per second WAN transceiver ports) of a network device, without using expensive and complicated equipment or an expert to analyze test results. The on-chip TDR diagnostic tool may map an application-specific integrated circuit (ASIC) of a network device to WAN transceiver ports of the network device and may report a condition for each WAN transceiver port. The on-chip TDR diagnostic tool may utilize logistical regression to determine an optimal programmable threshold for a pass/no pass determination for each WAN transceiver port. Thus, the network device conserves computing resources, networking resources, and/or the like that would otherwise have been consumed by disassembling the network device, utilizing an instrument-grade TDR and a HCB to measure WAN transceiver ports of the network device, analyzing test results and identifying problems in the network device, and/or the like.

FIGS. 1A-1H are diagrams of an example 100 associated with testing transceiver ports of a network device with on-chip time domain reflectometry diagnostic tests. As shown in FIGS. 1A-1H, example 100 includes a user device and a server device associated with a network of network devices. Further details of the user device, the server device, the network, and the network devices are provided elsewhere herein.

As shown in FIG. 1A, and by reference number 105, the network device may receive network traffic. For example, the user device and the server device may utilize the network of the network devices to exchange network traffic (e.g., packets). In some implementations, the user device may generate network traffic destined for the server device, and may provide the network traffic to the network via the network device. The network device may receive the network traffic and may forward the network traffic to the server device directly or via one or more of the other network devices.

Figure 1B:
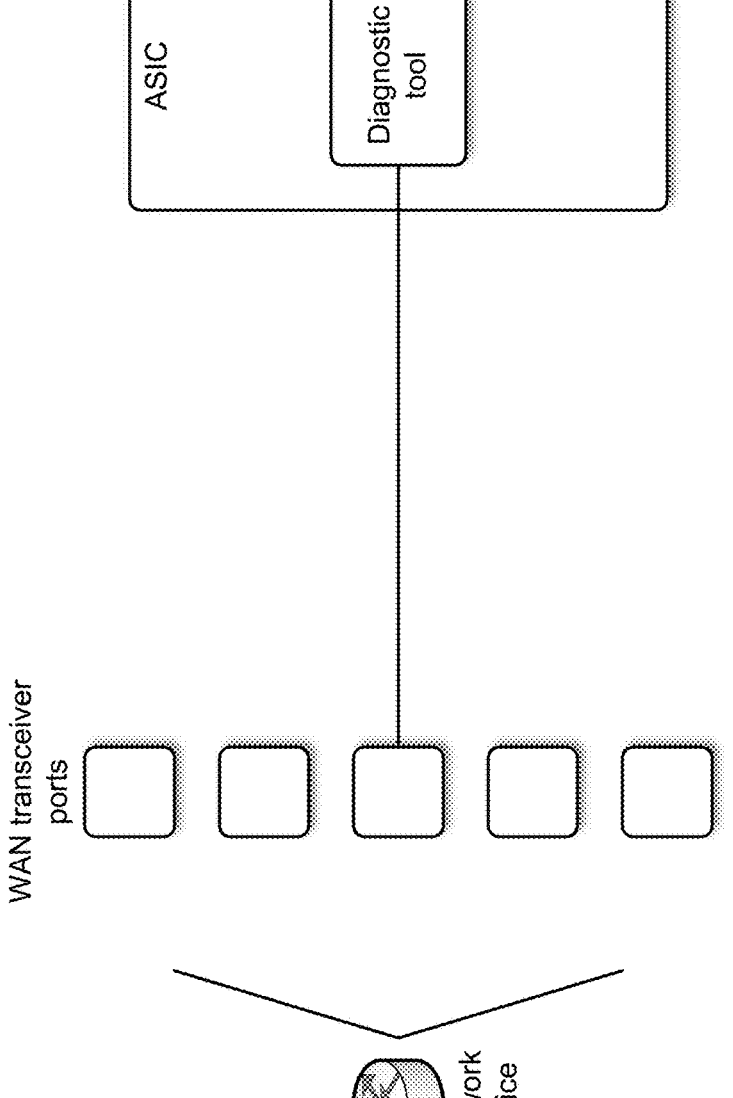

As shown in FIG. 1B, the network device may include multiple high-speed (e.g., one hundred gigabits) WAN transceiver (serdes) ports that need to be tested before deployment of the network device and/or during deployment of the network device. A serdes is an integrated circuit transceiver that converts parallel data to serial data and vice-versa. A transmitter section is a parallel-to-serial converter, and a receiver section is a serial-to-parallel converter. The WAN transceiver ports of a network device need to be tested for improperly connected cable connectors, opens, or shorts (e.g., that could cause functional failure in the network device), and/or the like. As further shown in FIG. 1B, the network device may include a processing chip (e.g., an ASIC) with a diagnostic tool. The diagnostic tool of the network device may connect to one of the WAN transceiver ports of the network device. In some implementations, the diagnostic tool may include an on-chip TDR diagnostic tool that detects opens (e.g., breaks in paths), shorts, matched channels, and unmatched channels on the WAN transceiver ports of the network device without disrupting the network device.

Figure 1C:
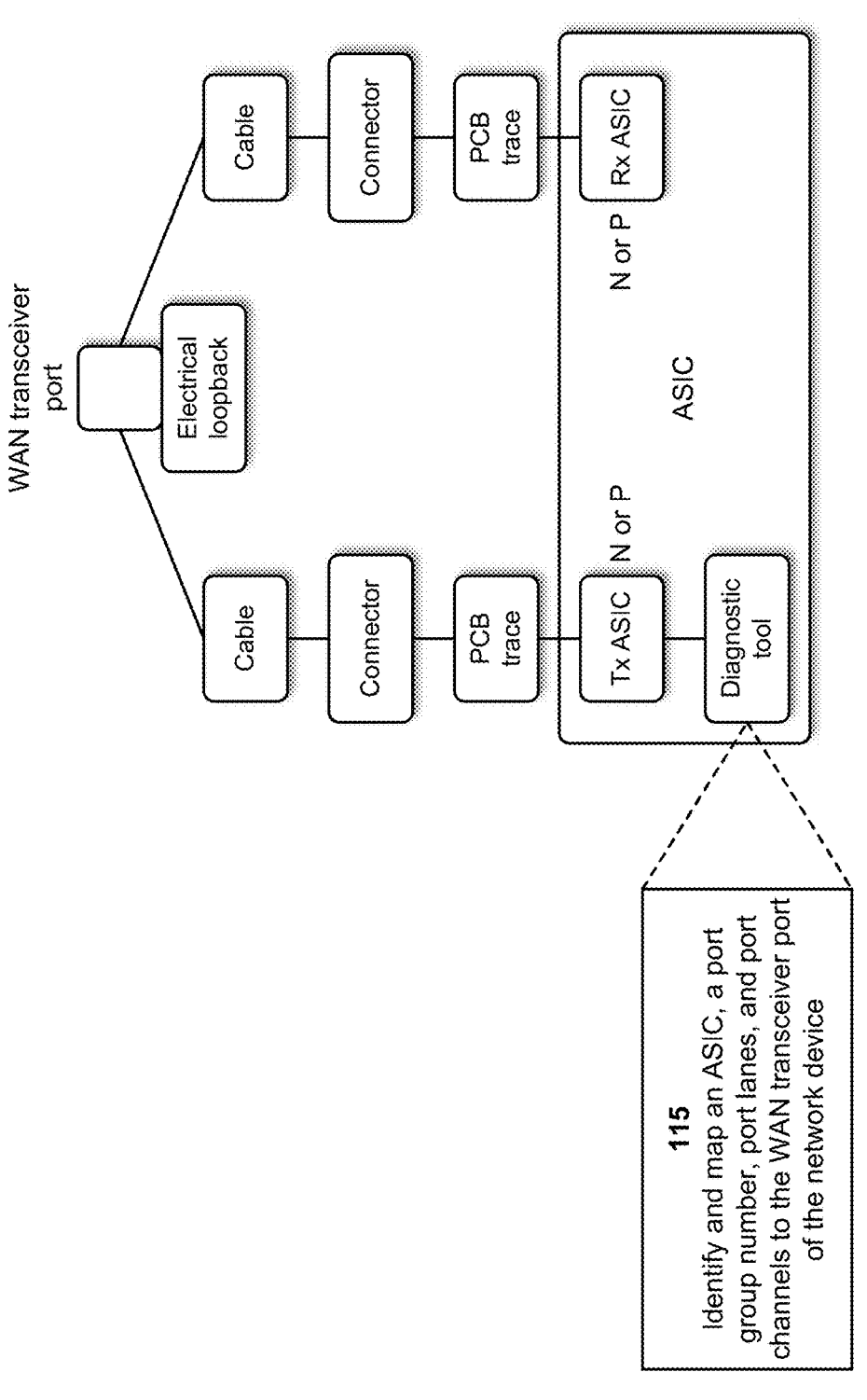

As shown in FIG. 1C, the diagnostic tool of the ASIC of the network device may be associated with a transmit (Tx) application-specific integrated circuit (ASIC), which may be connected to a first printed circuit board (PCB) trace, a first connector, and a first cable (e.g., a flyover cable) of a first channel (e.g., an N channel) and a second channel (e.g., a P channel). The first cable (e.g., the first channel and the second channel) may connect to the WAN transceiver port, which includes an electrical loopback mechanism. The diagnostic tool of the ASIC of the network device may also be associated with a receiver (Rx) ASIC, which may be connected to a second PCB trace, a second connector, and a second cable (e.g., a flyover cable) of the first channel and the second channel. The second cable (e.g., the first channel and the second channel) may connect to the WAN transceiver port. The electrical loopback of the WAN transceiver port may be connected to the first channel and the second channel between the first cable and the second cable. The electrical loopback is not necessary when the transceiver port is a fabric (e.g., chip-to-chip) transceiver port.

As further shown in FIG. 1C, and by reference number 115, the diagnostic tool may identify and map an ASIC, a port group number, port lanes, and port channels to the WAN transceiver port of the network device. For example, the WAN transceiver port may be associated with a port number and the diagnostic tool may identify the port number of the WAN transceiver port. The Tx ASIC, the Rx ASIC, the first and second PCB traces, the first and second connectors, and the first and second cables may be associated with a port group number, port lanes (e.g., zero through seven), and port channels (e.g., the first channel and the second channel). The diagnostic tool may identify the port group number, the port lanes, and the port channels associated with the Tx ASIC, the Rx ASIC, the first and second PCB traces, the first and second connectors, and the first and second cables. The diagnostic tool may map the Tx ASIC, the Rx ASIC, the port group number, the port lanes, and the port channels with the port number of the WAN transceiver port. In this way, the diagnostic tool simplifies the testing process since a user of the diagnostic tool is not required to know the complex port mapping of the network device.

Figure 1D:
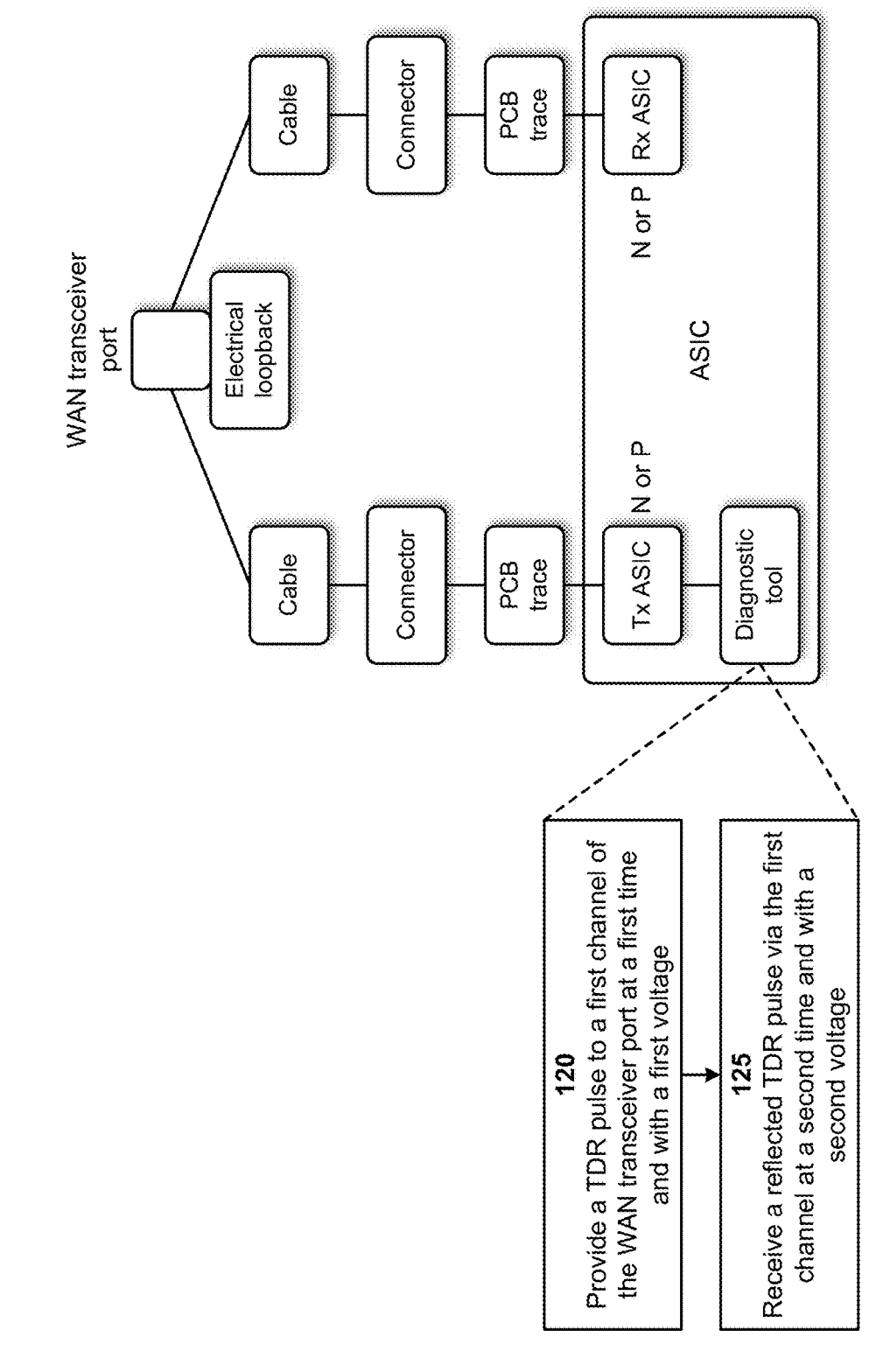

As shown in FIG. 1D, and by reference number 120, the diagnostic tool may provide a TDR pulse to a first channel of the WAN transceiver port at a first time and with a first voltage. For example, the diagnostic tool may generate a TDR pulse (e.g., a fast edge step) at a first time and with a first voltage. TDR measures a reflection in a path due to an impedance variation between a time a TDR pulse has been sent and returned. By measuring the time and knowing a propagation velocity of the medium (e.g., the channel properties), a distance to the reflection point can be calculated. The diagnostic tool may provide the TDR pulse to the first channel (e.g., the N channel) of the WAN transceiver port at the first time and with the first voltage.

As further shown in FIG. 1D, and by reference number 125, the diagnostic tool may receive a reflected TDR pulse via the first channel at a second time and with a second voltage. For example, the TDR pulse may travel through the first channel and be reflected in the first channel. The reflected TDR pulse may return to the diagnostic tool and may be received by the diagnostic tool at a second time (e.g., after the first time) and with a second voltage. In some implementations, if there are problems with the first channel (e.g., an open, a short, and/or the like), the TDR pulse may travel through a portion of the first channel (e.g., to a location of an open, a short, and/or the like) and may be reflected back to the diagnostic tool via the portion the first channel. In such implementations, the second voltage of the reflected TDR pulse may be different than the first voltage. Alternatively, if there are no problems with the first channel, the TDR pulse may travel through the entire first channel and may be reflected back to the diagnostic tool via the first channel. In such implementations, the second voltage of the reflected TDR pulse may be the same as or nearly the same as the first voltage.

Figure 1E:
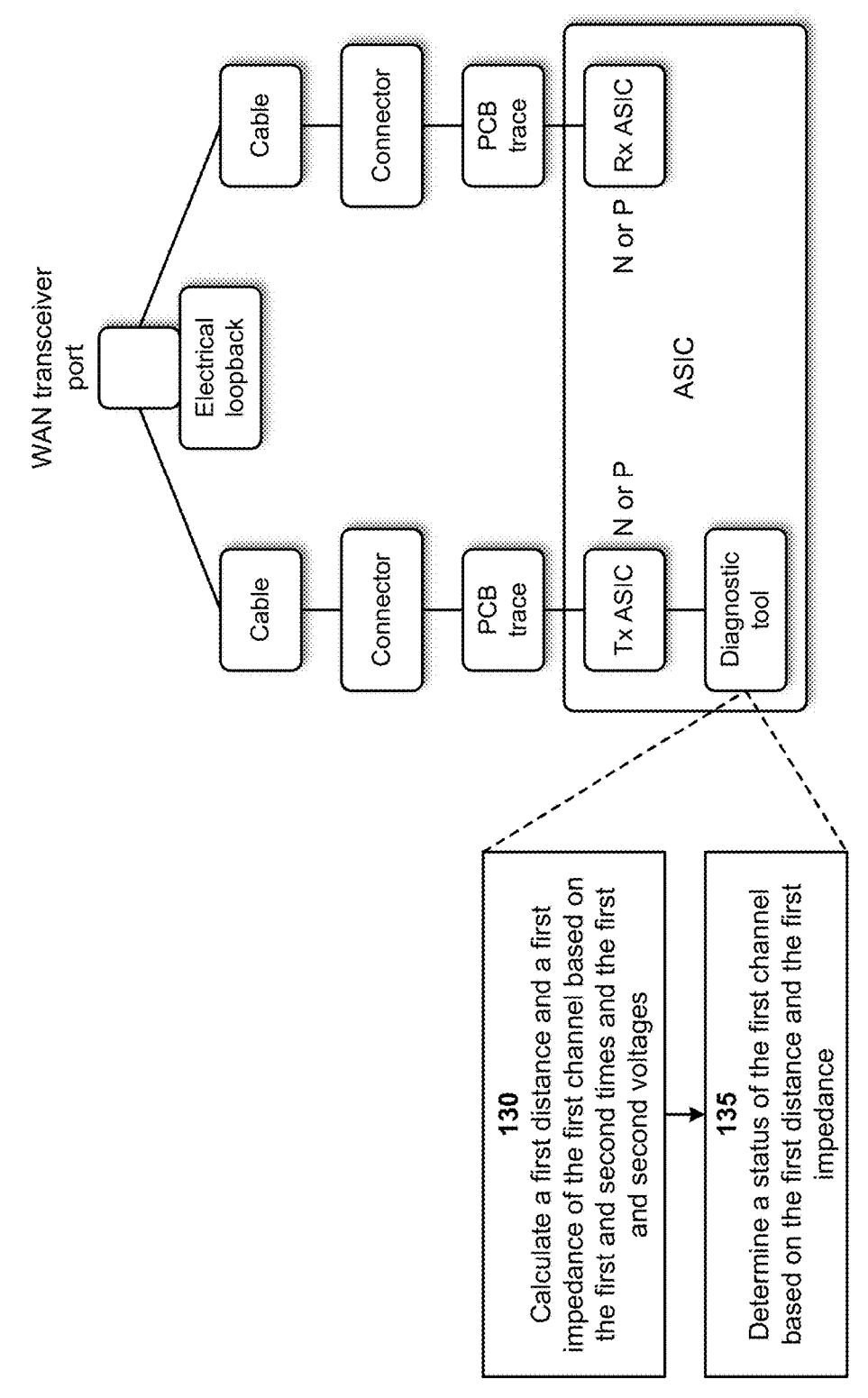

As shown in FIG. 1E, and by reference number 130, the diagnostic tool may calculate a first distance and a first impedance of the first channel based on the first and second times and the first and second voltages. For example, the diagnostic tool may calculate the first distance based on the first time, the second time, and a propagation velocity of the medium (e.g., the channel properties). The diagnostic tool may determine a time difference between the first time and the second time and may multiply the time difference by the propagation velocity of the medium (e.g., the channel properties) to calculate the first distance. In some implementations, if there are problems with the first channel (e.g., an open, a short, and/or the like), the first distance may be shorter than the entire length of the first channel. Alternatively, if there are no problems with the first channel, the first distance may be equivalent to the entire length of the first channel. The diagnostic tool may calculate the first impedance by dividing the first voltage by a current of the TDR pulse or by dividing the second voltage by the current of the TDR pulse. If there are problems with the first channel, the first impedance calculated based on the first voltage may fail to match or substantially match the first impedance calculated based on the second voltage (e.g., an impedance mismatch). Alternatively, if there are no problems with the first channel, the first impedance calculated based on the first voltage may match the first impedance calculated based on the second voltage (e.g., an impedance match).

As further shown in FIG. 1E, and by reference number 135, the diagnostic tool may determine a status of the first channel based on the first distance and the first impedance. For example, the diagnostic tool may determine that there are no problems with the first channel when the first distance is equivalent to the entire length of the first channel and there is an impedance match associated with the first impedance. In some implementations, the diagnostic tool may determine that there is a break (or open) in the first channel when the first distance is less than the entire length of the first channel and based on the first impedance. In some implementations, the diagnostic tool may determine that there is a short associated with the first channel when the first distance is less than the entire length of the first channel and based on the first impedance. In some implementations, the diagnostic tool may determine that there is an impedance mismatch associated with the first channel when the first impedance calculated based on the first voltage fails to match the first impedance calculated based on the second voltage.

In some implementations, when the status of the first channel is a break or a short associated with the first channel, the diagnostic tool may determine a distance to the break or the short associated with the first channel based on the first distance, and may output the distance to the break or the short. In some implementations, the diagnostic tool may determine a location of a discontinuity (e.g., an open or a short) of the ASIC of the WAN transceiver port (e.g., at the Tx ASIC or at the Rx ASIC) based on the distance to the break or the short associated with the first channel. For example, when the distance is shorter, the diagnostic tool may associate the discontinuity with the Tx ASIC, the first PCB trace, the first connector, and/or the first cable. When the distance is longer, the diagnostic tool may associate the discontinuity with the Rx ASIC, the second PCB trace, the second connector, and/or the second cable. In such implementations, the diagnostic tool may provide an indication of whether the discontinuity (e.g., the open, short, mismatch, and/or the like) is located on the Tx side or the Rx side (e.g., for SiFly connectors) or a module connector side.

Figure 1F:
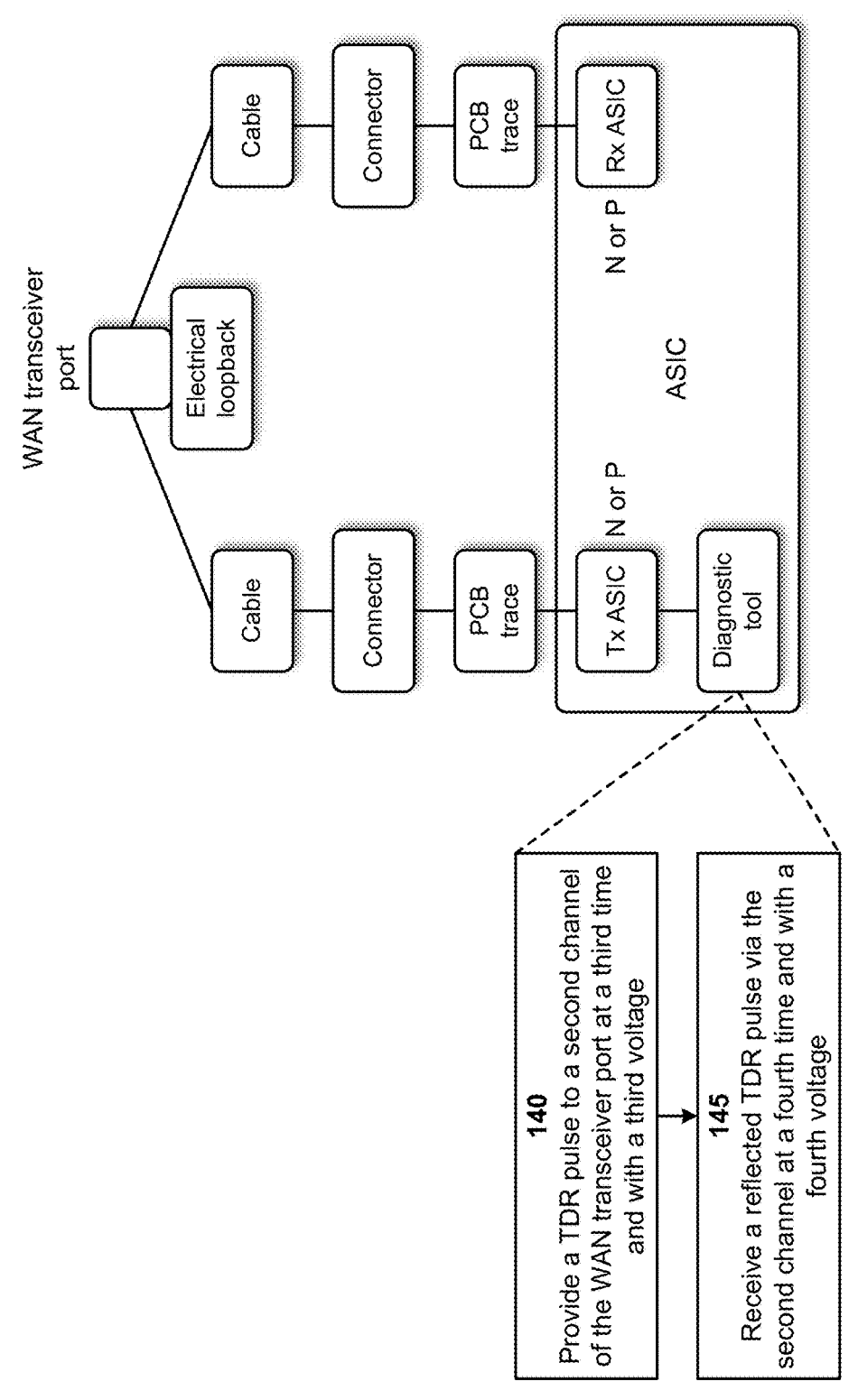

As shown in FIG. 1F, and by reference number 140, the diagnostic tool may provide a TDR pulse to a second channel of the WAN transceiver port at a third time and with a third voltage. For example, the diagnostic tool may generate a TDR pulse (e.g., a fast edge step) at a third time (e.g., equivalent to or different than the first time) and with a third voltage (e.g., equivalent to or different than the first voltage). TDR measures a reflection in a path due to an impedance variation between a time a TDR pulse has been sent and returned. By measuring the time and knowing a propagation velocity of the medium (e.g., the channel properties), a distance to the reflection point can be calculated. The diagnostic tool may provide the TDR pulse to the second channel (e.g., the P channel) of the WAN transceiver port at the third time and with the third voltage.

As further shown in FIG. 1F, and by reference number 145, the diagnostic tool may receive a reflected TDR pulse via the second channel at a fourth time and with a fourth voltage. For example, the TDR pulse may travel through the second channel and be reflected in the second channel. The reflected TDR pulse may return to the diagnostic tool and may be received by the diagnostic tool at a fourth time (e.g., after the third time) and with a fourth voltage. In some implementations, if there are problems with the second channel (e.g., an open, a short, and/or the like), the TDR pulse may travel through a portion of the second channel (e.g., to a location of an open, a short, and/or the like) and may be reflected back to the diagnostic tool via the portion the second channel. In such implementations, the fourth voltage of the reflected TDR pulse may be different than the third voltage. Alternatively, if there are no problems with the second channel, the TDR pulse may travel through the entire second channel and may be reflected back to the diagnostic tool via the second channel. In such implementations, the fourth voltage of the reflected TDR pulse may be the same as or nearly the same as the third voltage.

Figure 1G:
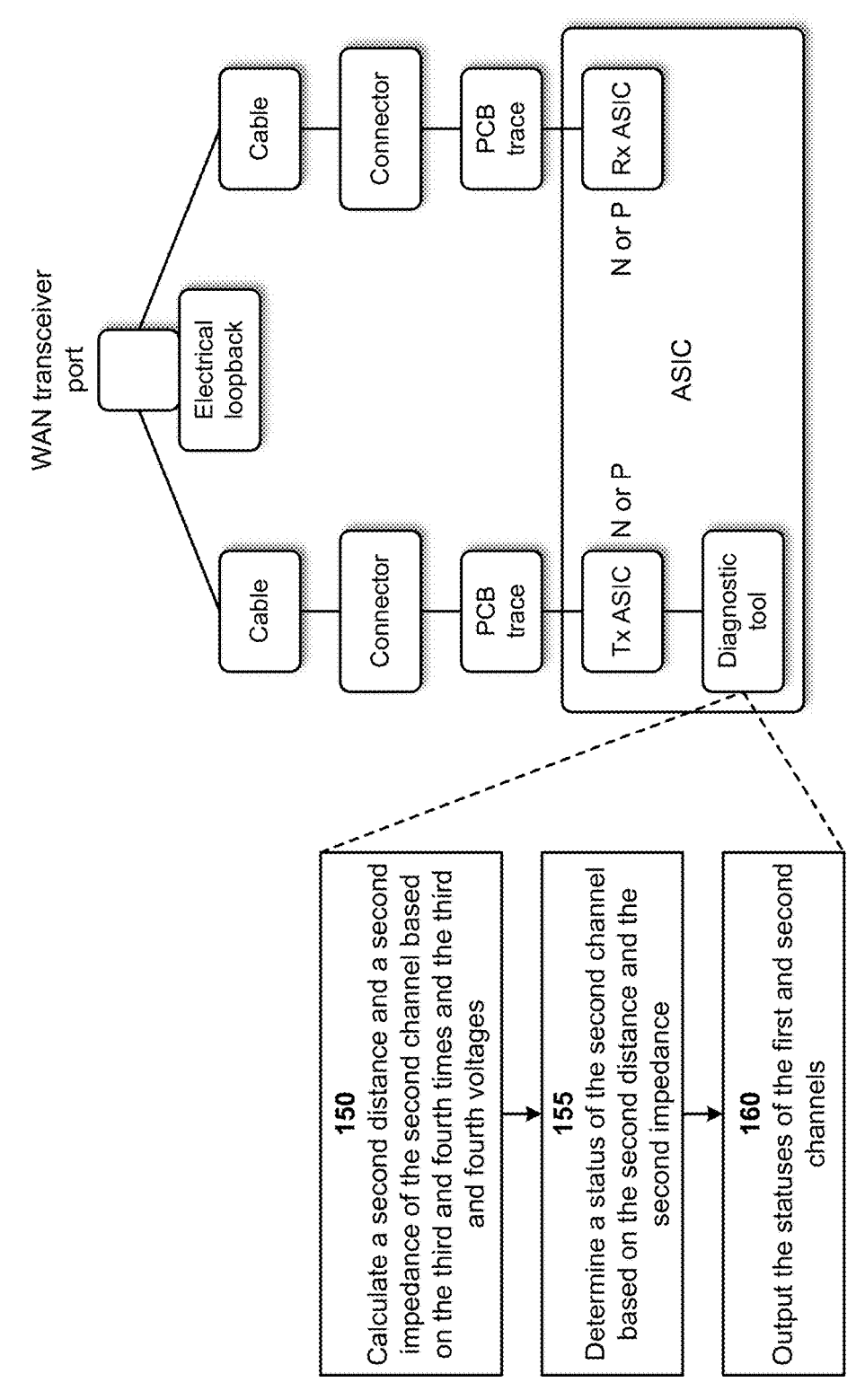

As shown in FIG. 1G, and by reference number 150, the diagnostic tool may calculate a second distance and a second impedance of the second channel based on the third and fourth times and the third and fourth voltages. For example, the diagnostic tool may calculate the second distance based on the third time, the fourth time, and a propagation velocity of the medium (e.g., the channel properties). The diagnostic tool may determine a time difference between the third time and the fourth time and may multiply the time difference by the propagation velocity of the medium (e.g., the channel properties) to calculate the second distance. In some implementations, if there are problems with the second channel (e.g., an open, a short, and/or the like), the second distance may be shorter than the entire length of the second channel. Alternatively, if there are no problems with the second channel, the second distance may be equivalent to the entire length of the second channel. The diagnostic tool may calculate the second impedance by dividing the third voltage by a current of the TDR pulse or by dividing the fourth voltage by the current of the TDR pulse. If there are problems with the second channel, the second impedance calculated based on the third voltage may fail to match the second impedance calculated based on the fourth voltage (e.g., an impedance mismatch). Alternatively, if there are no problems with the second channel, the second impedance calculated based on the third voltage may match the second impedance calculated based on the fourth voltage (e.g., an impedance match).

As further shown in FIG. 1G, and by reference number 155, the diagnostic tool may determine a status of the second channel based on the second distance and the second impedance. For example, the diagnostic tool may determine that there are no problems with the second channel when the second distance is equivalent to the entire length of the second channel and there is an impedance match associated with the second impedance. In some implementations, the diagnostic tool may determine that there is a break (or open) in the second channel when the second distance is less than the entire length of the second channel. In some implementations, the diagnostic tool may determine that there is a short associated with the second channel when the second distance is less than the entire length of the second channel. In some implementations, the diagnostic tool may determine that there is an impedance mismatch associated with the second channel when the second impedance calculated based on the third voltage fails to match the second impedance calculated based on the fourth voltage.

In some implementations, the diagnostic tool may determine a location of a discontinuity (e.g., an open or a short) of the ASIC of the WAN transceiver port (e.g., at the Tx ASIC or at the Rx ASIC) based on the distance to the break or the short associated with the second channel. For example, when the distance is shorter, the diagnostic tool may associate the discontinuity with the Tx ASIC, the first PCB trace, the first connector, and/or the first cable. When the distance is longer, the diagnostic tool may associate the discontinuity with the Rx ASIC, the second PCB trace, the second connector, and/or the second cable. In such implementations, the diagnostic tool may provide an indication of whether the discontinuity (e.g., the open, short, mismatch, and/or the like) is located on the Tx side or the Rx side (e.g., for SiFly connectors) or a module connector side.

As further shown in FIG. 1G, and by reference number 160, the diagnostic tool may output the statuses of the first and second channels. For example, the diagnostic tool may display the status of the first channel and the status of the second channel as determined by the diagnostic tool and described above. In some implementations, the diagnostic tool may provide the status of the first channel or the status of the second channel to another device (e.g., the user device). The user device may receive the status of the first channel and the status of the second channel and may display the status of the first channel and the status of the second channel to a user of the user device. In some implementations, the diagnostic tool may store the status of the first channel and the status of the second channel in a data structure (e.g., a database, a table, a list, and/or the like) associated with the diagnostic tool.

In this way, the diagnostic tool may detect open channels, short channels, and/or improperly seated connectors of a WAN transceiver port. The diagnostic tool may detect marginal channel impairments (e.g., large impedance discontinuities), may utilize logistical regression to determine an optimal threshold level for determining a pass or no pass condition for the WAN transceiver port, may detect opens or shorts for transmit fabric channels (e.g., chip-to-chip) with difficult access points for instrument-grade TDR testers (e.g., which requires disassembling fabric connectors), and/ or the like.

FIG. 1H depicts an example output of the diagnostic tool. As shown, a first WAN transceiver port may be associated with a port number of three (3), a port group number of fifteen (15), and eight port lane pairs (e.g., numbered zero (0) through seven (7)). Each port lane pair may be associated with a first channel (e.g., the N channel) and a second channel (e.g., the P channel). As further shown, the first WAN transceiver port may include a first open associated with the first channel of port lane zero (0), and the first open may occur at a first distance (e.g., a location) of 23.0. The first WAN transceiver port may include a second open associated with the second channel of port lane one (1), and the second open may occur at a second distance (e.g., a location) of 4.0. From the calculated first distance, the diagnostic tool may determine that the first open of WAN transceiver port is located at the Rx ASIC side, and from the calculated second distance (e.g., which is greater than the first distance), the diagnostic tool may determine that the second open of WAN transceiver port is located at the Tx ASIC side. The remaining port lanes and channels associated with the first WAN transceiver port may be operational as indicated by the impedance matched results.

As further shown in FIG. 1H, a second WAN transceiver port may be associated with a port number of thirty-two (32), a port group number of five (5), and eight port lane pairs (e.g., numbered zero (0) through seven (7)). Each port lane pair may be associated with a first channel (e.g., the N channel) and a second channel (e.g., the P channel). The port lanes and channels associated with the second WAN transceiver port may be operational as indicated by the imped-ance matched results.

In this way, the network device tests transceiver ports of a network device with on-chip time domain reflectometry diagnostic tests. For example, the network device may include an on-chip TDR diagnostic tool that detects opens, shorts, matched channels, and unmatched channels on WAN transceiver (e.g., serdes) ports of a network device without disrupting the network device. The on-chip TDR diagnostic tool may be used by manufacturing personnel, engineering personnel, or field-testing teams to identify problems with WAN transceiver ports of a network device, without using expensive and complicated equipment or an expert to ana-lyze test results. The on-chip TDR diagnostic tool may map an ASIC of a network device to WAN transceiver ports of the network device and may report a condition for each WAN transceiver port. The on-chip TDR diagnostic tool may provide a programmable threshold to enable a pass/no pass determination for each WAN transceiver port or fabric (chip-to-chip) transceiver port. Thus, the network device conserves computing resources, networking resources, and/ or the like that would otherwise have been consumed by disassembling the network device, utilizing an instrument-grade TDR and using a HCB to measure WAN transceiver ports of the network device, analyzing test results and identifying problems in the network device, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
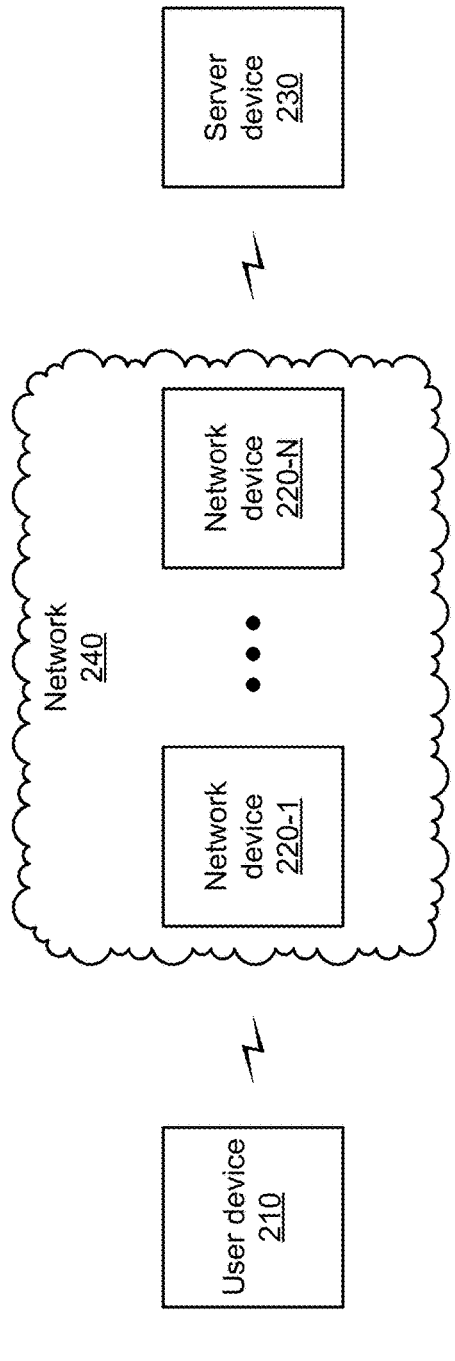
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a group of network devices 220 (shown as network device 220-1 through network device 220-N), a server device 230, and a network 240. Devices of the environment 200 may interconnect via wired connec-tions, wireless connections, or a combination of wired and wireless connections.

The user device 210 may include one or more devices capable of receiving, generating, storing, processing, and/or providing information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wear-able communication device (e.g., a smart wristwatch, a pair of smart eyeglasses, a head mounted display, or a virtual reality headset), or a similar type of device.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, pro-viding, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
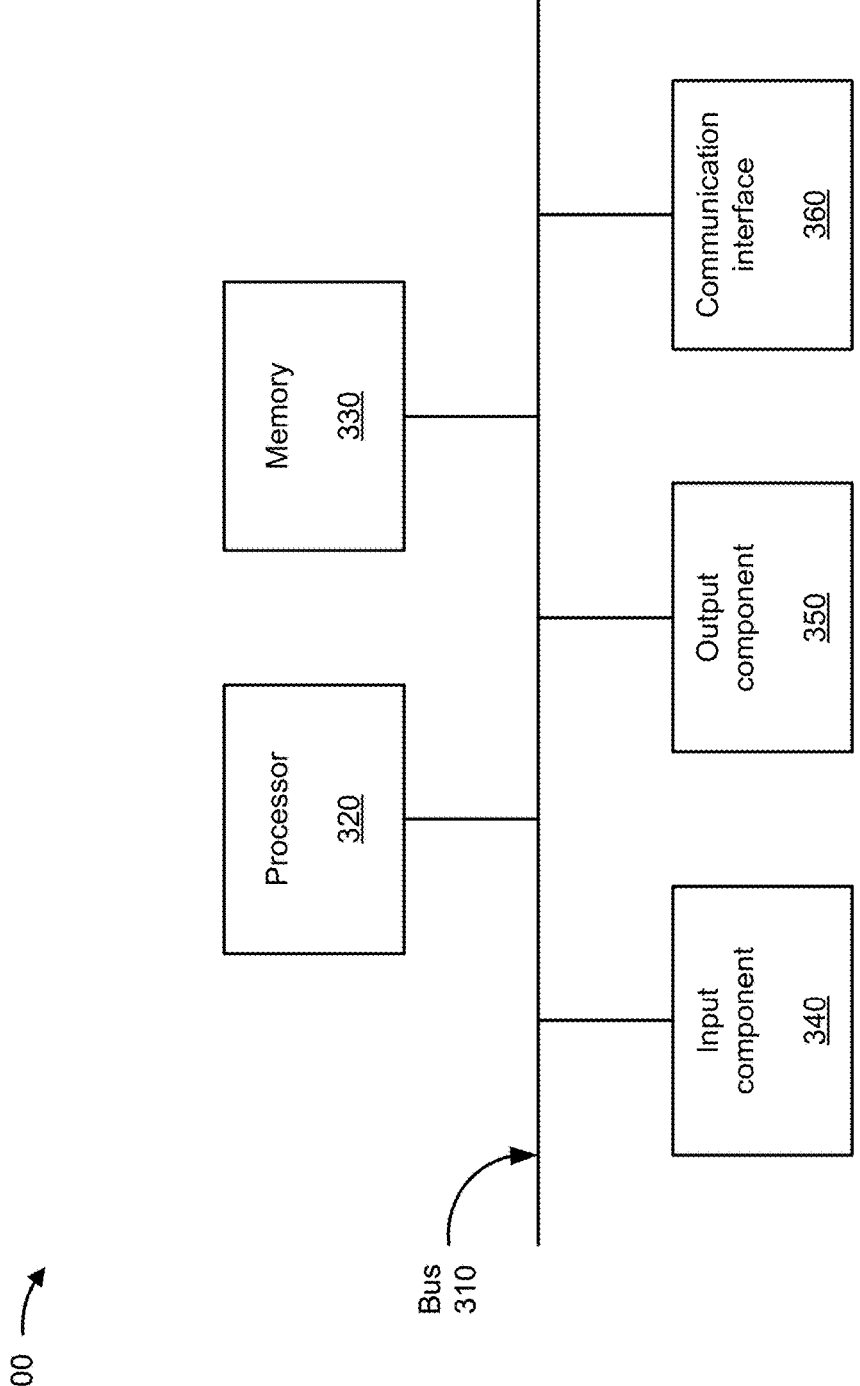
FIGS. 3 and 4 are diagrams of example components of one or more devices of FIG. 2.

FIG. 3 is a diagram of example components of one or more devices of FIG. 2. The example components may be included in a device 300, which may correspond to the user device 210, the network device 220, and/or the server device 230. In some implementations, the user device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
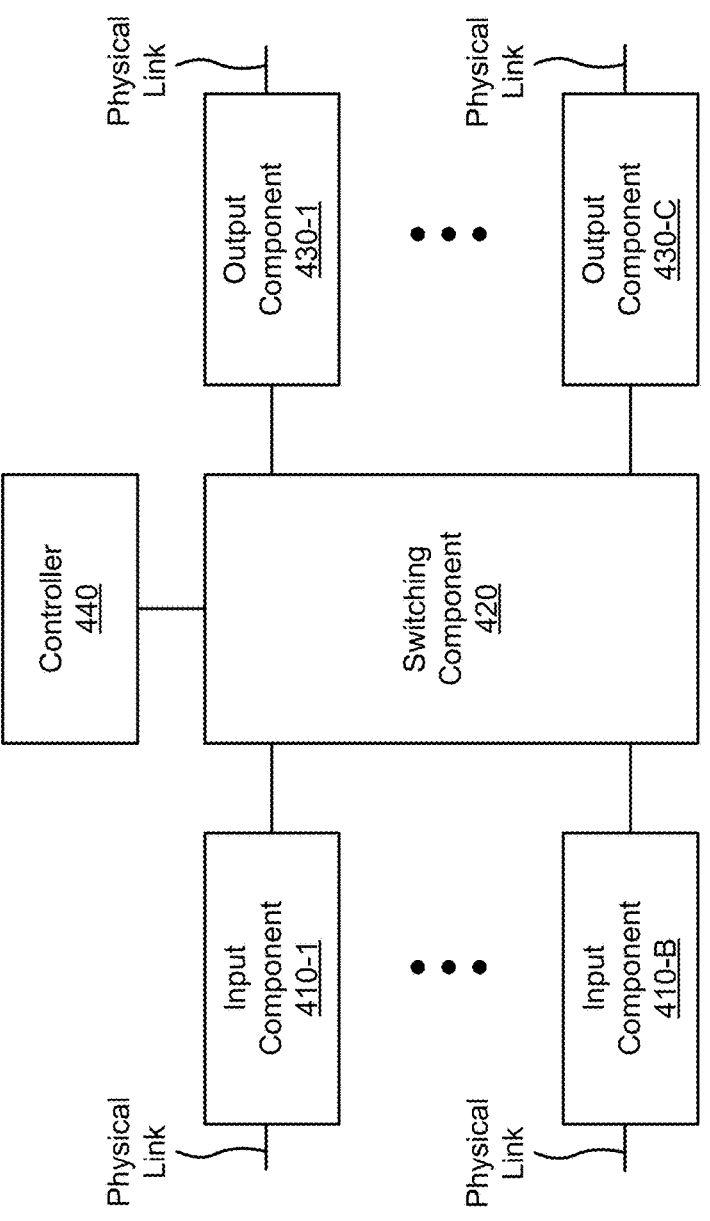

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for testing transceiver ports of a network device with on-chip time domain reflectometry diagnostic tests. In some implementations, one or more process blocks of FIG. 5 may be performed by a network device (e.g., the network device 220). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include identifying an integrated circuit, a port group number, port lanes, and port channels associated with a transceiver port of a network device (block 510). For example, the network device may identify an integrated circuit, a port group number, port lanes, and port channels associated with a transceiver port of a network device, as described above. In some implementations, the transceiver port is a wide area network transceiver port or a fabric transceiver port. In some implementations, the network device includes an on-chip time domain reflectometry diagnostic tool.

As further shown in FIG. 5, process 500 may include mapping the integrated circuit, the port group number, the port lanes, and the port channels to the transceiver port (block 520). For example, the network device may map the integrated circuit, the port group number, the port lanes, and the port channels to the transceiver port, as described above.

As further shown in FIG. 5, process 500 may include providing a first time domain reflectometry pulse to a first channel of the transceiver port at a first time and with a first voltage (block 530). For example, the network device may provide a first time domain reflectometry pulse to a first channel of the transceiver port at a first time and with a first voltage, as described above.

As further shown in FIG. 5, process 500 may include receiving a first reflected time domain reflectometry pulse via the first channel at a second time and with a second voltage (block 540). For example, the network device may receive a first reflected time domain reflectometry pulse via the first channel at a second time and with a second voltage, as described above.

As further shown in FIG. 5, process 500 may include calculating a first distance and a first impedance of the first channel based on the first time, the second time, the first voltage, and the second voltage (block 550). For example, the network device may calculate a first distance and a first impedance of the first channel based on the first time, the second time, the first voltage, and the second voltage, as described above.

As further shown in FIG. 5, process 500 may include determining a status of the first channel based on the first distance and the first impedance (block 560). For example, the network devices may determine a status of the first channel based on the first distance and the first impedance, as described above. In some implementations, the status of the first channel includes data identifying one or more of a break (open) in the first channel, a short associated with the first channel, an impedance match associated with the first channel, or an impedance mismatch associated with the first channel. In some implementations, determining the status of the first channel based on the first distance and the first impedance includes comparing the first impedance with a threshold, determining whether the first channel passes or fails based on the comparing the first impedance with the threshold, and providing an indication of whether the first channel passes or fails.

As further shown in FIG. 5, process 500 may include outputting the status of the first channel (block 570). For example, the network device may output the status of the first channel, as described above.

In some implementations, process 500 includes providing a second time domain reflectometry pulse to a second channel of the transceiver port at a third time and with a third voltage; receiving a second reflected time domain reflectometry pulse via the second channel at a fourth time and with a fourth voltage; calculating a second distance and a second impedance of the second channel based on the third time, the fourth time, the third voltage, and the fourth voltage; determining a status of the second channel based on the second distance and the second impedance; and outputting the status of the second channel. In some implementations, determining the status of the second channel based on the second distance and the second impedance includes comparing the second impedance with a threshold, determining whether the second channel passes or fails based on the comparing the second impedance with the threshold, and providing an indication of whether the second channel passes or fails.

In some implementations, the status of the second channel includes data identifying one or more of a break in the second channel, a short associated with the second channel, an impedance match associated with the second channel, or an impedance mismatch associated with the second channel. In some implementations, when the status of the second channel is a break or a short associated with the second channel, process 500 includes determining a distance to the break or the short associated with the second channel based on the second distance, and outputting the distance to the break or the short. In some implementations, process 500 includes determining whether the integrated circuit is a transmit integrated circuit or a receive integrated circuit based on the distance to the break or the short, and providing an indication of whether the integrated circuit is a transmit integrated circuit or a receive integrated circuit.

In some implementations, when the status of the first channel is a break or a short associated with the first channel, process 500 includes determining a distance to the break or the short associated with the first channel based on the first distance, and outputting the distance to the break or the short. In some implementations, process 500 includes determining whether the integrated circuit is a transmit integrated circuit or a receive integrated circuit based on the distance to the break or the short, and providing an indication of whether the integrated circuit is a transmit integrated circuit or a receive integrated circuit.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

identifying, by a network device, a port group number, port lanes, and port channels associated with a transmitter integrated circuit and a receiver integrated circuit of the network device;

mapping, by the network device, the transmitter integrated circuit, the receiver integrated circuit, the port group number, the port lanes, and the port channels to a transceiver port of the network device;

providing, by the network device, a first time domain reflectometry pulse to a first channel of the transceiver port at a first time and with a first voltage;

receiving, by the network device, a first reflected time domain reflectometry pulse via the first channel at a second time and with a second voltage;

calculating, by the network device, a first distance and a first impedance of the first channel based on the first time, the second time, the first voltage, and the second voltage;

determining, by the network device, a status of the first channel based on the first distance and the first impedance, wherein determining the status of the first channel comprises:

determining a programmable threshold corresponding to the first channel using logistical regression, and assigning a pass status or a fail status to the first channel based at least in part on comparing the first impedance with the programmable threshold; and outputting, by the network device, the status of the first channel.

2. The method of claim 1, further comprising:

providing a second time domain reflectometry pulse to a second channel of the transceiver port at a third time and with a third voltage;

receiving a second reflected time domain reflectometry pulse via the second channel at a fourth time and with a fourth voltage;

calculating a second distance and a second impedance of the second channel based on the third time, the fourth time, the third voltage, and the fourth voltage;

determining a status of the second channel based on the second distance and the second impedance; and outputting the status of the second channel.

3. The method of claim 2, wherein the status of the first channel or the second channel further includes data identifying one or more of:

a break in the first channel or the second channel, a short associated with the first channel or the second channel, an impedance match associated with the first channel or the second channel, or an impedance mismatch associated with the first channel or the second channel.

4. The method of claim 2, wherein when the status of the first channel or the second channel includes data identifying a break or a short associated with the first channel or the second channel, the method further comprises:

determining a distance to the break or the short associated with the first channel or the second channel based on the first distance or the second distance; and outputting the distance to the break or the short.

5. The method of claim 2, wherein determining the status of the second channel based on the second distance and the second impedance comprises:

comparing the second impedance with the programmable threshold;

determining whether the second channel passes or fails based on the comparing the second impedance with the programmable threshold; and providing an indication of whether the second channel passes or fails.

6. The method of claim 1, wherein the transceiver port is a wide area network transceiver port or a fabric transceiver port.

7. The method of claim 1, wherein determining the status of the first channel further comprises:

determining that a discontinuity is associated with the transmitter integrated circuit based on a determination that the first distance is shorter than a distance corresponding to the first channel; or determining that a discontinuity is associated with the receiver integrated circuit based on a determination that the first distance is longer than a distance corresponding to the first channel.

8. A network device, comprising:

one or more processors to:

identify a port group number, port lanes, and port channels associated with a transmitter integrated circuit and a receiver integrated circuit of the network device;

map the transmitter integrated circuit, the receiver integrated circuit, the port group number, the port lanes, and the port channels to a transceiver port of the network device;

provide a first time domain reflectometry pulse to a first channel of the transceiver port at a first time and with a first voltage;

receive a first reflected time domain reflectometry pulse via the first channel at a second time and with a second voltage;

calculate a first distance and a first impedance of the first channel based on the first time, the second time, the first voltage, and the second voltage;

determine a status of the first channel based on the first distance and the first impedance, wherein the one or more processors, to determine the status, are to:

determine a programmable threshold corresponding to the first channel using logistical regression, and assign a pass status or a fail status to the first channel based at least in part on comparing the first impedance with the programmable threshold;

provide a second time domain reflectometry pulse to a second channel of the transceiver port at a third time and with a third voltage;

receive a second reflected time domain reflectometry pulse via the second channel at a fourth time and with a fourth voltage;

calculate a second distance and a second impedance of the second channel based on the third time, the fourth time, the third voltage, and the fourth voltage;

determine a status of the second channel based on the second distance and the second impedance; and output the status of the first channel and the status of the second channel.

9. The network device of claim 8, wherein the transceiver port is a wide area network transceiver port or a fabric transceiver port.

10. The network device of claim 8, wherein the status of the second channel further includes data identifying one or more of:

a short associated with the second channel, an impedance match associated with the second channel, or an impedance mismatch associated with the second channel.

11. The network device of claim 8, wherein the one or more processors are further to, when the status of the second channel includes data identifying a break or a short associated with the second channel:

determine a distance to the break or the short associated with the second channel based on the second distance; and output the distance to the break or the short.

12. The network device of claim 8, wherein the one or more processors, to determine the status of the second channel based on the second distance and the second impedance, are to:

compare the second impedance with the programmable threshold;

determine whether the second channel passes or fails based on the comparing the second impedance with the programmable threshold; and provide an indication of whether the second channel passes or fails.

13. The network device of claim 8,
wherein the network device includes an on-chip time
domain reflectometry diagnostic tool.

14. The network device of claim 8,
wherein the one or more processors, to determine the
status of the first channel, are further configured to:
determine that a discontinuity is associated with the
transmitter integrated circuit based on a determination that the first distance is shorter than a distance
corresponding to the first channel; or
determine that a discontinuity is associated with the
receiver integrated circuit based on a determination
that the first distance is longer than a distance
corresponding to the first channel.

15. A non-transitory computer-readable medium storing a
set of instructions, the set of instructions comprising:
one or more instructions that, when executed by one or
more processors of a network device, cause the network
device to:
identify a port group number, port lanes, and port
channels associated with a transmitter integrated
circuit and a receiver integrated circuit of the network device;
map the transmitter integrated circuit, the receiver
integrated circuit, the port group number, the port
lanes, and the port channels to a transceiver port of
the network device;
provide a first time domain reflectometry pulse to a first
channel of the transceiver port at a first time and with
a first voltage;
receive a first reflected time domain reflectometry pulse
via the first channel at a second time and with a
second voltage;
calculate a first distance and a first impedance of the
first channel based on the first time, the second time,
the first voltage, and the second voltage;
determine a status of the first channel based on the first
distance and the first impedance, wherein the one or
more instructions, to determine the status of the first
channel, cause the network device to:
determine a programmable threshold corresponding to
the first channel using logistical regression, and
assign a pass status or a fail status to the first channel
based at least in part on comparing the first impedance with the programmable threshold;
provide a second time domain reflectometry pulse to a
second channel of the transceiver port at a third time
and with a third voltage;

receive a second reflected time domain reflectometry
pulse via the second channel at a fourth time and
with a fourth voltage;
calculate a second distance and a second impedance of
the second channel based on the third time, the fourth
time, the third voltage, and the fourth voltage;
determine a status of the second channel based on the
second distance and the second impedance; and
output the status of the first channel and the status of the
second channel.

16. The non-transitory computer-readable medium of
claim 15,
wherein the status of the first channel further includes data
identifying one or more of:
a short associated with the first channel,
an impedance match associated with the first channel,
or
an impedance mismatch associated with the first channel.

17. The non-transitory computer-readable medium of
claim 15,
wherein the transceiver port is a wide area network
transceiver port.

18. The non-transitory computer-readable medium of
claim 15,
wherein the transceiver port is a fabric transceiver port.

19. The non-transitory computer-readable medium of
claim 15,
wherein the status of the second channel includes data
identifying one or more of:
a break in the second channel,
a short associated with the second channel,
an impedance match associated with the second channel, or
an impedance mismatch associated with the second
channel.

20. The non-transitory computer-readable medium of
claim 15, wherein, when the status of the second channel
includes data identifying a break or a short associated with
the second channel, the one or more instructions further
cause the network device to:
determine a distance to the break or the short associated
with the second channel based on the second distance;
and
output the distance to the break or the short.

* * * * *